US006007757A

United States Patent [19]

Honkura et al.

[11] Patent Number: 6,007,757

[45] Date of Patent: Dec. 28, 1999

[54] METHOD OF PRODUCING AN ANISOTROPIC BONDED MAGNET

[75] Inventors: Yoshinobu Honkura, Aichi-ken; Hironari Mitarai, Tokai; Yoshinobu Sugiura, Handa; Koichi Maekawa, Chita, all of Japan

[73] Assignee: Aichi Steel Works, Ltd., Tokai, Japan

[21] Appl. No.: 08/589,635

[22] Filed: Jan. 22, 1996

[51] Int. Cl.$^6$ ..................... B29C 35/02

[52] U.S. Cl. ..................... 264/429; 264/442

[58] Field of Search ..................... 264/427, 429, 264/442

[56] References Cited

U.S. PATENT DOCUMENTS

| | | | |
|---|---|---|---|
| 2,188,091 | 1/1940 | Baermann, Jr. | 264/429 |
| 3,477,961 | 11/1969 | Castagna et al. | 264/429 |
| 3,867,299 | 2/1975 | Rohatgi | 264/429 |
| 3,933,536 | 1/1976 | Doser et al. | 148/105 |
| 4,141,943 | 2/1979 | Houska | 264/24 |
| 4,562,019 | 12/1985 | Inoue | 264/429 |
| 5,114,604 | 5/1992 | Ishii et al. | 252/62.54 |

FOREIGN PATENT DOCUMENTS

| | | |
|---|---|---|
| 0 325 403 | 7/1989 | European Pat. Off. . |
| 0 663 672 | 7/1995 | European Pat. Off. . |
| 2 319 185 | 7/1976 | France . |
| 2 350 585 | 5/1974 | Germany . |
| 39 38 952 | 5/1990 | Germany . |
| 42 28 520 | 3/1994 | Germany . |
| 1-205403 | 8/1989 | Japan . |
| 2-116104 | 4/1990 | Japan . |
| 4-11702 | 1/1992 | Japan . |
| 4-349603 | 12/1992 | Japan . |
| 1447264 | 8/1976 | United Kingdom . |

*Primary Examiner*—Christopher A. Fiorilla
*Attorney, Agent, or Firm*—Jacobson, Price, Holman & Stern, PLLC

[57] ABSTRACT

Compression molding suitable anisotropic magnet powder had not been established facing the difficulty of contradiction of high density and magnet powder alignment. By applying both magnetic field and pressure at the moment when the resin is melted into liquid state by heating, both high density and a high degree of magnet powder alignment are attained. Furthermore, application of degassing and ultrasonic vibration were found to be effective. An anisotropic bonded magnet with the maximum energy of more than 20 MGOe, in other words, more than 80% of the theoretical value of maximum energy product, is obtained.

17 Claims, 10 Drawing Sheets

METHOD OF PRODUCING AN ANISOTROPIC BONDED MAGNET

BACKGROUND OF THE INVENTION

1. Field of the Invention

The present invention relates to an anisotropic bonded magnet which is made by compression molding to obtain a high density and a high magnetic powder alignment and also relates to its production method.

2. Description of the Related Art

Bonded magnets are made of magnet powders embedded in organic resin or metallic resin. They have lower levels of magnetic energy compared to their fully densified counterparts such as sintered magnets.

Bonded magnets, which have excellent formability, can be formed in complex shapes with close mechanical tolerances as well as are free from cracking. Because of the above mentioned advantages, their application area is rapidly spreading.

They may be formed by extrusion, compression, and injection molding.

Injection molding has advantages in forming complex shapes and integrated components with high precision. Injection molding can form the most complicated shapes among three mentioned molding methods. However the magnet has low magnetic energy because the volume fraction of magnet powder is limited to under 60 to 65 percent to provide good flowability in the process.

Extrusion molding has merit during continuous production to provides a low cost magnet. Also extrusion molding gives better magnetic energy than injection molding due to the volume fraction of magnet powder of 70 to 75 percent.

Compression molding gives the highest magnetic energy because of maximum volume fraction of 80 to 90 percent. It can also produce magnets of complex shape.

As mentioned previously, the major shortcoming of the bonded magnet is its low maximum energy product. Recently anisotropic magnet powders with high maximum energy product have been developed to overcome the mentioned shortcomings. However compression molding which is suitable for anisotropic magnet powder has not been established facing the difficulty of contradiction of high density and magnet powder alignment.

Here, anisotropic magnet powder is an aggregation of fine magnet particles which consist of uniaxial crystals and have unidirectional magnetization. Magnet powder alignment means to align the magnetization of each particle to an applied magnetic field.

To solve the difficulty described above, the following technology concerning compression molding has been proposed.

In Japanese patent application Laid- Open (Kokai) No. 1-205403, warm molding is proposed in order to utilize a resin softening phenomenon before curing reaction is set forth. The compound consists of melt spun magnet powder and thermosetting resin.

The patent application discloses that high density is attained by use of a heating temperature of 30 to 100° C. at which the softening phenomenon occurs before curing reaction. Above 100° C. curing has begun before the magnet was sufficiently densified. Further, adhesion of resin to the mold is observed.

Using a compound which consists of $Nd_{14}Fe_{76}Co_5B_5$ melt spun powder and epoxy resin, a bonded magnet with (BH)max of 10.3–11.2 MGOe and density of 6.7 to 7.1 g/cm$^3$ was attained by compression molding at 45 to 77° C.

However the magnet shows a relatively low maximum energy product of 11.2 MGOe in spite of high density of 7.1 g/cm$^3$, because the melt spun rare earth magnet powder is isotropic.

Furthermore, the applied resin shows poor thermal durability due to its low melting point.

In Japanese patent application Laid- Open (Kokai) No. 2-116104, compression molding below curing temperature followed by curing is proposed. The molding temperature is set between softening point and about 50° C. higher in order to increase flowability of the resin. In this embodiment a bonded magnet with maximum energy product of 9.0 MGOe and density of 6.1 g/cm$^3$ was obtained.

A compound consists of ortho-cresol novolak type epoxy resin with a melting point of 40° C. and rare earth magnet powder was compression-molded at 100° C. followed by curing at 120° C. The patent application discloses that the magnet which has superior thermal durability and relatively high magnetic property with high density are obtained by forming at an elevated temperature to keep the softening state of the resin. However the magnet shows considerably low maximum energy product of 9.0 MGOe because of low density of 6.1 g/cm$^3$. Furthermore the invention requires a curing process after compression molding.

Japanese patent application Laid- Open (Kokai) No. 4-11702 proposes fine resin powder which enables high magnetic property by means of reducing the amount of resin to that of magnet powder. In the invention compression molding with a magnetic field is disclosed.

The particle size of the magnet powder is from 0.1 to 500 $\mu$m, which is ordinary for this kind of use, and the particle size of the resin powder is chosen to be one tenth of the magnet powder. When they are mixed into a compound, fine resin powder covers the surface of magnet powder evenly by electro-static force. In the invention, a bonded magnet is manufactured in a single process, namely, curing is performed at the same time as compression molding. In at least one of the embodiments, a magnetic field of 15,000 Oe is applied in the compression molding.

In embodiment 1, a compound of barium ferrite magnet powder and fine polymethylmethacrylate powder with the particle size of 0.05 to 0.06 $\mu$m was compression-molded with the applied magnetic field of 15000 Oe. Curing reaction proceeds simultaneously with the molding. The obtained bonded magnet had the density of 3.40 g/m$^3$ and (BH)max of 1.35 MGOe.

In embodiment 3, a compound of NdFeB magnet powder (MQ powder A) and fine polymethylmethacrylate powder with the particle size of 0.05 to 0.06 $\mu$m was compression-molded with the applied magnetic field of 5000 Oe. Curing reaction proceeds simultaneously with the molding. The magnet had the density of 5.49 g/cm$^3$ and (BH)max of 7.3 MGOe.

In the embodiments, anisotropic powder such as hexagonal plate shaped barium ferrite or elongated NdFeB powder is used. Applied magnetic field aligns the direction of magnetization of the anisotropic powder and thus increases the maximum energy product of the bonded magnet.

In spite of the statements that the invention provides good magnetic property and high density because of reduced amount of resin, the obtained bonded magnets have low maximum energy product and low density. Therefore this invention is considered rather to combine molding and curing processes into one production step.

Japanese patent application Laid- Open (Kokai) No. 4-349603 proposes micro-capsules made of thermal polymerized resin which contains lubricant. The capsule coats the surface of magnet powder and reduces frictional resistance of the compound at the mold surface to obtain a high densified magnet. Furthermore the capsule avoids galling of mold by the compound.

In embodiment 1, a compound of (Pr, Sm)Co magnet powder are compression-molded with an applied magnetic field of 24 kOe and cured at 180° C. A bonded magnet with maximum energy product of 15.0–15.7 MGOe and density of 6.82–6.95 g/cm$^3$ was obtained.

However the invented process had not attained sufficient maximum energy product in spite of its high density. It may be due to low degree of magnet powder alignment although compression molding is carried out in a magnetic field of as high as 24 kOe. Another problem in this invention is that the manufacturing process of the compound becomes quite complicated. Furthermore, high density brings less amount of resin as binder and causes brittleness of the bonded magnet as well as low flowability in molding.

The major shortcoming of the bonded magnet is low maximum energy product. Therefore development of suitable compression molding has been anticipated to improve maximum energy product. The problem in compression molding of a bonded magnet was contradiction of high density and magnet powder alignment. The problem has not been solved in spite of various inventions as described previously.

SUMMARY OF THE INVENTION

To solve the problem three major aspects should be considered. First, to use anisotropic NdFeB powder with high maximum energy product; second, to increase the volume fraction of magnet powder and reduce the volume of void in the bonded magnet by compression molding; third, to achieve high degree of magnet powder alignment, preferably to the limit of theoretical value of perfect alignment.

However these three aspects contradict one another. Increased volume fraction of magnet causes deterioration of alignment. Anisotropic powder is apt to aggregate and disturb alignment.

An object of the invention is to offer a method of compression molding which achieves both high density and good magnet powder alignment and provide a bonded magnet with excellent magnetic property at an economical cost. It also gives good thermal durability to the magnet.

Compression molding utilizing NdFeB powder has been studied to solve the problem previously discribed and the following results are obtained;

(1) high degree of magnet powder alignment is obtained by applying both magnetic field and pressure at the moment when the resin is melted into liquid state, preferably at the point that viscosity is lowest. This method has been lead by the characteristics of curing process of thermosetting resin in which the resin melts into liquid for a short period of time before hardened by curing reaction.

(2) During the compression molding, curing proceeds keeping magnet powder alignment to the applied field because the pressure is applied hydrostatically due to liquid state of resin.

(3) Rotation and movement of magnet powder in the liquid resin brought by applied magnetic field accelerate the evacuation of the gas contained in compound or generated by melting reaction.

(4) Applying pulse field is effective to magnet powder alignment.

(5) Reduced pressure helps degassing after resin is melted into liquid state.

(6) Curing can be done by applying further heating and increased pressure in compression molding. Heating temperature above 120° C., preferably above 150° C., required to obtain thermal durability of the bonded magnet, because the resin with good thermal durability has relatively high temperature for softening, melting, and curing. This molding temperature also shortens the curing time and leads improvement of production rate.

Present invention is established based on the results described above. The crucial point of the invention is to carry out compression molding with applying magnetic field at the moment when thermosetting resin melts into liquid. The mold used is equipped with temperature and magnetic field control system.

The inventive production process is as follows:

To prepare compound which consists of anisotropic NdFeB magnet powder and thermosetting resin, fill it in a mold equipped with control system for temperature and magnetic field, raise the temperature above the curing point, apply magnetic field to align the magnet powder magnetization at the moment that the resin melts into liquid state, simultaneously apply pressure to form desired shape and keep the state to finish curing reaction.

Details of the present invention is described as follows;

Anisotropic magnet powder is used to produce anisotropic boned magnet with good magnetic property. The kinds of anisotropic magnet powder are R1—Co type magnet, R2—Fe—B type magnet, and R3—Fe—N type magnet. R1 and R3 contain at least one kind of rare earth element including Sm. R2 contains at least one kind of rare earth element including Nd.

R1—Co type magnet includes Sm—Co magnet, Sm—Co type magnet in which part of Sm is substituted by at least one element from Nd, Pr, Y, Ce, or Dy, and Sm—Co—Cu—Fe type magnet powder to which at least one element of Zr, Hf, or Ti are added, R2—Fe—B type magnet includes Nd—Fe—B magnet, Nd—Fe—B type magnet in which part of Nd is substituted by at least one element of Pr, Y, or Dy, and Nd—Fe—B—Co magnet and Nd—Fe—B—Co type magnet to which at least one element of Ga, Zr, Hf, Al, Cu, Mn, Si or Ti are added.

Nd—Fe—B magnet powder is prepared by the following process. Magnet powder is melt spun, then formed by hot hydrostatic isotropic press. After forming it is plastic deformed and mechanically crushed and ground into powder.

Another preparation method is HDDR (Hydrogenation, disproportionation, desorption and recombination) treatment.

Generally the powder produced by HDDR treatment has nearly spherical particles which is hard to magnetically align.

The present invention is especially effective in achieving high degree of magnetic alignment for HDDR treated powder.

R3—Fe—N type magnet includes Sm—Fe—N type magnet, Sm—Fe—Co—N type magnet and Sm—Fe—V—N type magnet.

Magnet powder can be finely ground and granulated into pellets. Fine ground magnet particles are less resistant in rotation and easily aligned by applied field.

Epoxy resin, phenol resin, and melamine resin are some instances of thermosetting resin. The present invention does not need to limit the softening temperature from 30 to 70° C. as required in Japanese patent application Laid- Open (Kokai) No. 1-205403 and can apply to thermosetting resin with softening point above 70° C. For good thermal durability, resin with softening point above 120° C., preferably above 150° C., is required.

Thermosetting resin used in the present invention must be solid state powder at room temperature. Solid state has advantage in supplying constant amount of powder into the mold and therefore the quality of product such as density, magnetic property and dimensions are kept constant. Solid state is also preferable from the standpoint of easy handling of the powder.

Small amount of additives can be mixed to the thermosetting resin as needed. The kind of additive is a lubricant chosen from zinc stearate, aluminum stearate, alcohol lubricant, and coupling agent such as silane coupling agent, titan coupling agent, and hardening agent such as 4.4'-diaminodiphenylsulfone (DDS), and cure accelerator such as TTP-S (trade name of a product of Hokko chemical Co.) These additives control the timing of molding, enhance the adhesion of melted resin to magnet powder, and provide easy mold release.

The compound is prepared by uniformly mixing 80–90 vol % of anisotropic magnetic powder and 10–20 vol % of thermosetting resin by kneading machine. If necessary 0.1–2.0 vol % of lubricant, hardening agent, cure accelerator, or coupling agent can be added.

In present invention not only a compound described above but those compounds described in Japanese patent application Laid- Open 2-27801, 4-349602 and 4-349603 in which the magnet powder coated by thermosetting resin or lubricant can be used.

Now the means to solve the contradiction of high density and magnet powder alignment is described in detail.

Molding apparatus used for the present invention is shown in FIG. 2 through FIG. 6. Controlling device of the mold temperature is shown in FIGS. 2 and 3. FIG. 2 shows a schematic illustration of a vertical magnetic field molding apparatus which consists of a die 22*a* with a built-in heater 22*d*, compression device 23 which apply pressure to the upper punch 22*b* and the lower punch 22*c* in vertical direction, and an electromagnet 21 which generates a magnetic field along the compression direction. The vertical magnetic field molding is applied for molding of ring magnets with radial magnetization or cylindrical magnets with axial magnetization.

FIG. 3 shows schematic illustration of a horizontal magnetic field molding apparatus which consists of a die 22*a* with a built-in heater 22*d*, compression device 23 which applies pressure to the upper punch 22*b* and the lower punch 22*c* in a vertical direction, and an electromagnet 21 which generates a magnetic field at right angles to the compression direction. The horizontal magnetic field molding is for rectangular parallelepiped magnets or ring magnets with axial magnetization.

FIG. 4 shows a horizontal magnetic field molding apparatus which has a rotary pump 24 to evacuate gases contained in the melted resin by reducing the pressure inside the mold via die 22*a*.

FIG. 5 shows a molding apparatus which has ultrasonic oscillatior 25 to apply ultrasonic vibration inside the mold which consists of the die 22*a*, upper punch and lower punch in addition to the apparatus shown in FIG. 4.

FIG. 6 shows a schematic illustration of a molding apparatus which consists of a die 22*a* with a built-in heater 22*d*, compression device 23 which applies pressure to the upper punch 22*b* and the lower punch 22*c* in a vertical direction, an electromagnet 21 which generates a magnetic field along the compression direction and a coreless coil 26 around the die 22*a* to generate a static magnetic field above 10 kOe or a pulse magnetic field above 10 kOe, preferably a pulse magnetic field above 25 kOe.

After filling the compound into the mold at a set temperature, a magnetic field is started to apply to align the magnetization of the powder. The thermosetting resin in the compound filled in the mold is gradually melted into liquid from solid state. In the alignment process the degree of magnetic alignment is determined by the readiness of rotation and movement of the magnet particles in the liquid resin and by the intensity and time duration of applied magnetic field. Theoretically all magnetizing directions of the powder are aligned unidirectionally.

In FIGS. 7 and 8 models for the state of magnetization direction of the powder in liquid resin 36 which is melted by heater 31 before and after magnetic alignment process are shown. FIG. 7 shows before the application of magnetic field by the electromagnet 32, FIG. 8 after the application of field. The direction of magnetic field 33 is at right angles to the direction of vertical compression 34. Magnetization of the powder is aligned from random direction 35*a* in FIG. 7 before application of the magnetic field to unidirection 35*b* which is the same direction as the applied magnetic field 33 in FIG. 8. FIG. 8 shows 100% of alignment in which all magnetizations are aligned unidirectionally.

To obtain high degree of alignment it is important to increase mobility of magnet powder when a magnetic field is applied. The highest mobility in the liquid resin are obtained when the viscosity of resin is lowest.

The viscosity of the melt resin (ρ) is a function of both heating temperature (T) and heating time (t). It is measured by Curelastometer or flow tester. The heating time for minimum viscosity at a given heating temperature is obtained by the function above.

FIG. 9 shows time dependency of the melt thermosetting epoxy resin viscosity at heating temperatures of 100, 120, 160, and 180° C. It is seen that less heating time is required for minimum viscosity (ρ min) as the heating temperature increases. At minimum viscosity the highest degree of alignment is obtained. Also applying pressure to densify the magnet at minimum viscosity range brings less disturbance in alignment compared to the alignment obtained at more viscous state. The reason is that the pressure becomes hydrostatic in liquid.

Application of a magnetic field requires a certain duration of time to obtain good magnetic alignment. It is because the viscosity of resin shows minimum after certain time at given heating temperature as seen in FIG. 9. Thus magnetic field application should be started right after filling the mold and should be kept while thermosetting resin softens and melt into liquid state. It must be kept after loading of the pressure which is started at the moment of lowest viscosity, in order to overcome disturbance caused by pressure.

Application of high intensity of magnetic field is required for high degree of magnetic alignment. In present invention more than 10 kOe of static magnetic field is required. It is because that a magnetic field of less than 10 kOe is insufficient in aligning powder magnetization. Similarly for applying pulse magnetic field, a magnetic field more 10 kOe is necessary. In this case more than 25 kOe is desirable.

It is favorable to apply ultrasonic vibration with frequency of 20 to 50 kHz to obtain high degree of alignment. A frequency below 20 kHz can not oscillate magnet particles in viscous melt resin sufficiently. A frequency above 50 kHz can not give enough magnitude of amplitude to the powder and thus efficiency of energy transmission to the magnet powder is lowered.

In compression molding with magnetic field, pressure is an important factor to improve the magnetic property of the bonded magnet by means of achieving highdensity. A greater molding pressure provides higher density of bonded magnet, although the lifetime of the mold is shortened. In the present invention the required pressure is between 4.0 and 10.0 ton/cm$^2$, preferably between 6.0 and 8.0 ton/cm$^2$. At a pressure below 4.0 ton/cm$^2$ it is not possible to obtain desired density and the magnetic property. On the other hand at a pressure above 10.0 ton cm$^2$ the life of the mold decreases drastically. Furthermore degassing the air contained in compound or the generated gas by melting is required to achieve higher density. Degassing is applied at either stage described as follows. One is to apply degassing after preforming a compact at low pressure and before melting by heating. The other is to apply degassing from liquid resin after melting. For the latter case, a molding apparatus shown in FIG. 4 is used.

In the former case of degassing from preformed compact before melting, preforming is carried out at a pressure of 1.0–4.0 ton/cm$^2$ after filling a compound into the mold. At a pressure below 1.0 ton/cm$^2$ degassing effect is not notable. On the other hand at a pressure above 4.0 ton/cm$^2$ degassing becomes ineffective because the gas is trapped in the preformed compact.

In the later case of degassing from melt resin, gases generated in melting process and adsorbed on the surface of magnet powder is removed as the powder rotates and moves by applied magnetic field in the melt resin.

It is desirable that the gas bubbles in the melt resin is degassed by evacuating inside the mold to vacuum. The pressure is set to be 10–500 torr. for degassing. At a pressure below 10 torr. it is not desirable because evacuation of melt resin occurs as well as the gas. On the other hand at a pressure above 500 torr. degassing does not proceed.

After compression molding with applied magnetic field curing is performed by maintaining the elevated temperature. In this invention molding process united with curing process offers two advantages. One is to increase production rate. Another is to keep close dimensional tolerances of bonded magnet because it is cured in the mold free from dimensional changes. Needless to say that curing may be done after taking a magnet from the mold and put into a curing furnace.

Now the characteristics of the bonded magnet produced by the present invention are described.

Theoretical limit of maximum energy product of a bonded magnet is determined by the maximum energy product and volume fraction of magnet powder. The intrinsic maximum energy product of powder is noted as X (MGOe), so that the maximum energy product of fully densified sinterd magnet X100 equals to X. The maximum energy product of bonded magnet in which the volume fraction of magnet powder is V (vol. %) is noted as Xv (MGOe).

FIG. 10 shows an ideal magnetic property of a fully densified magnet which consists of 100 vol % of magnet powder. Applied field (H) is taken as abscissa and magnetization (M) and magnetic flux density (B) as ordinate. Thick lines show B-H curve and thin lines M-H curve. In the figure, the area 51*a* in second quadrant gives the area (X100) of maximum energy product ((BH)max).

FIG. 11 shows a magnetic property of bonded magnet which consists of Vvol % of magnet powder and (100-V) vol % of resin powder. The magnetization of the bonded manget decreases by the magnetization (M) corresponds to (100-V) % of resin powder compared to that of the magnet with 100 vol % of magnet powder. As a consequence, B in B-H curve decreses. In the figure, the area 52*a* gives the area (Xv) of maximum energy product ((BH)max) for the bonded magnet. As seen in the figure, the maximum energy product ((BH)max) of the bonded magnet is proportional to the square of the volume fraction of the magnet powder in the magnet. The present invention offers maximum energy product above 80% of Xv for bonded magnets.

$$Y = \left(\frac{V_1}{100}\right)^2 \times \frac{80}{100} \times (X_1)$$

Where, V1 denotes volume fraction of magnet powder in a bonded magnet, and take value between 80 and 90%. X1 denotes maximum energy product of magnet powder and X1 is desirable to be more than 30 MGOe.

The maximum energy product of the anisotropic bonded magnet is desirable to be more than 20.0 MGOe.

The present invention offers high degree of magnet powder alignment and high volume fraction of magnet powder by applying both magnetic field and pressure at the moment when the resin is melted into liquid state in the compression molding using anisotropic magnet powder. It also offers high density by degassing the air contained in compound or the generated gas by melting. Furthermore, good alignment of magnet powder is given by application of ultrasonic vibration and pulse magnetic field. As a consequence a anisotropic bonded magnet with more than 80% of theoretical limit of maximum energy product is produced.

DETAILED DESCRIPTION OF THE PREFERRED EMBODIMENTS

Figure 1:
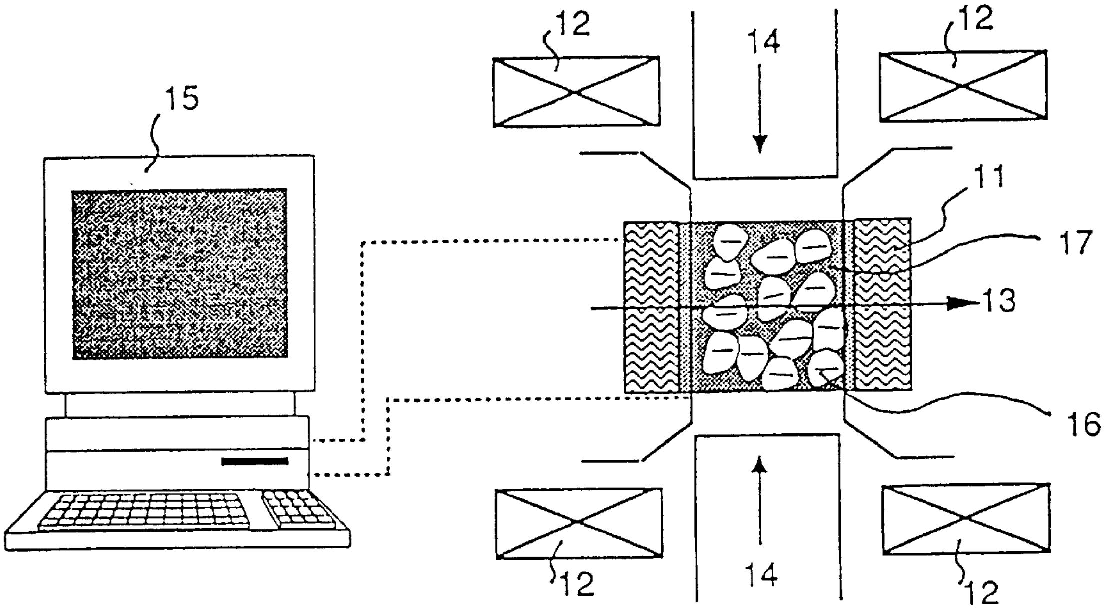
FIG. 1 shows principle of the invention.

Embodiments according to the present invention will be described.

First, preparation method of the compound is given as follows.

Compounds were prepared by mixing magnet powder and thermosetting resin in a set ratio. As for magnet powder, four kinds of powder were used: high Co containing NdFeB type by HDDR treatment, low Co containing NdFeB type by HDDR treatment, SmFeN type mechanically ground after nitriding, and ground SmCo type magnet. As for thermosetting resins, two kinds were prepared to mix with above four kinds of magnet powder.

The preparation method of the thermosetting resin is given as follows. Epoxy resin powder (trade name Epicoat 1004 manufactured by Shell Epoxy Co.) as a main powder, diaminodiphenylmethane (DDM, a product of Wako Pure Chemical Co.) as hardening agent at a ratio of 0.05 against epoxy resin powder weight of unity, TPP-S (trade name of product of Hokko Chemical Co.) as cure accelerator at a ratio of 0.02 against epoxy resin powder weight of unity, and Hext S (trade name of a product of Hext Japan Co.) as internal mold releasing agent at a ratio of 0.022 against epoxy resin powder weight of unity were blended at an elevated temperature and then crushed into compound powder, then 0.5 wt. % of coupling agent was added. Hereafter this compound will be referred as compound A.

By similar manner, a powder using low-molecular-weight epoxy resin powder (trade name Epicoat 801 manufactured by Shell Epoxy Co.) was prepared. Hereafter this compound will be referred as compound B. Compound A is used in the embodiments 1-a to 6-2-c and compound A and B were used in the embodiment 7-a, b, respectively.

Next, the preparation method of the four kinds of magnet powders will be described in order of high Co containing NdFeB type, low Co containing NdFeB type, SmFeN type, and SmCo type magnet powder.

High Co containing NdFeB type alloy with a composition of $Nd_{12.5}Fe_{59.1}Co_{20.5}B_{6.1}Ga_{1.8}$ was melted in a 30 kg VIM (vacuum induction melting) furnace and cast into an ingot. The ingot was heat-treated for the soaking time of 40 hour at 1100° C. in 200 torr. argon pressure in vacuum furnace, then crushed into lumps with about 30 mm diameter. The material was subjected to HDDR treatment in which hydrogenation at 800° C. for three hours at pressurized hydrogen atmosphere of 13 kg/cm$^2$, desorption at 800° C. for 1 hour in a vacuum of 3x10–5 torr., and qenching were carried out. As a result, aggregation of fine powder was obtained. It was lightly ground in a mortar, ground in n-hexane in a ball mill, and classified into a powder with below 212 $\mu$m grain.

The magnetic properties of the powder obtained in the above manner measured by VSM (vibrating sample magnetometer) were as follows: maximum energy product (BH)max is 36.0 MGOe, residual magnetic flux Br 12.8 kG, and coercive force iHc 11.5 kOe. Hereafter the powder will be referred to as NdFeBtype magnet powder P1H.

Low Co containing NdFeB type allow has a composition of $Nd_{12.3}Fe_{76.0}Co_{5.0}B_{6.0}Ga_{0.5}Nb_{0.2}$. It was melted in a 30 kg VIM furnace and casted into an ingot. The ingot was heat-treated for the soaking time of 40 hour at 1100° C. in 200 torr. rgon pressure in vacuum furnace, then crushed into lumps with about 30 mm diameter. The material was subjected to HDDR treatment in which hydrogenation at 800° C. for three hours at pressurized hydrogen atmosphere of 0.4 kg/cm$^2$, desorption at 800° C. for 1 hour in a vacuum of 5x10–$^{-5}$ torr., and quenching were carried out. As a result, aggregation of fine powder was obtained. It was lightly ground in a mortar, ground in n- hexane in a ball mill, and classified into a powder with below 212 $\mu$m grain.

The magnetic properties of the powder obtained in the above manner measured by VSMare as follows: maximum energy product (BH)max is 40.0 MGOe, residual magnetic flux Br 13.2 kG, and coercive force iHc 14.0 kOe. Hereafter the powder will be referred as NdFeB type magnet powder P1L.

SmFeN type alloy has the chemical composition of the magnet powder was $Sm_{9.0}Fe_{77.0}N_{13.6}$. An alloy with a chemical composition of $Sm_{12.0}Fe_{88.0}$ was melted in a 30 kg VIM furnace and cast into an ingot. The ingot was crushed into lumps with about 30 mm diameter, nitrided at 450° C. for three hours in ammonia decomposed gas, heat-treated at 450° C. for 1 hour in argon atmosphere to homogenize nitrogen concentration, then ball-milled in n-hexane into powder with the diameter from 1 to 3 $\mu$m.

The magnetic properties of the powder obtained in the above manner measured by VSM are as follows: maximum energy product (BH)max is 35.0 MGOe, residual magnetic flux Br 13.0 kG, and coercive force iHc 8.8 kOe. Hereafter the powder will be referred to as NdFeB type magnet powder P2.

SmCo type alloy has a composition of $Sm_{10.8}Co_{54.5}Cu_{6.2}Fe_{25.9}Zr_{2.7}$. It was melted in a 30 kg VIM furnace and cast into an ingot. The ingot was homogenized at 1180° C. for a soaking time of 30 hour in argon atmosphere, aged at 800° C. f 24 hour in argon atmosphere, and then mechanically crushed into lumps with about 30 mm diameter, ball-milled in n-hexane into a powder with the diameter below 30 $\mu$m.

The magnetic properties of the powder obtained in the above manner measured by VSM are as follows: maximum energy product (BH)max is 31.0 MGOe, residual magnetic flux Br 12.0 kG, and coercive force iHc 11.5 kOe. Hereafter the powder will be referred as NdFeB type magnet powder P3.

These examples and comparative examples were formed to a rectangular parallelepiped with the size of 10x10x7 mm.

EXAMPLE 1 SERIES

The example 1-a, 1-b, 1-c were manufactured with NdFeB type magnet powder (P1H), SmFeN type (P2), and SmCo type (P3) as for magnet powder, respectively.

Figure 11:
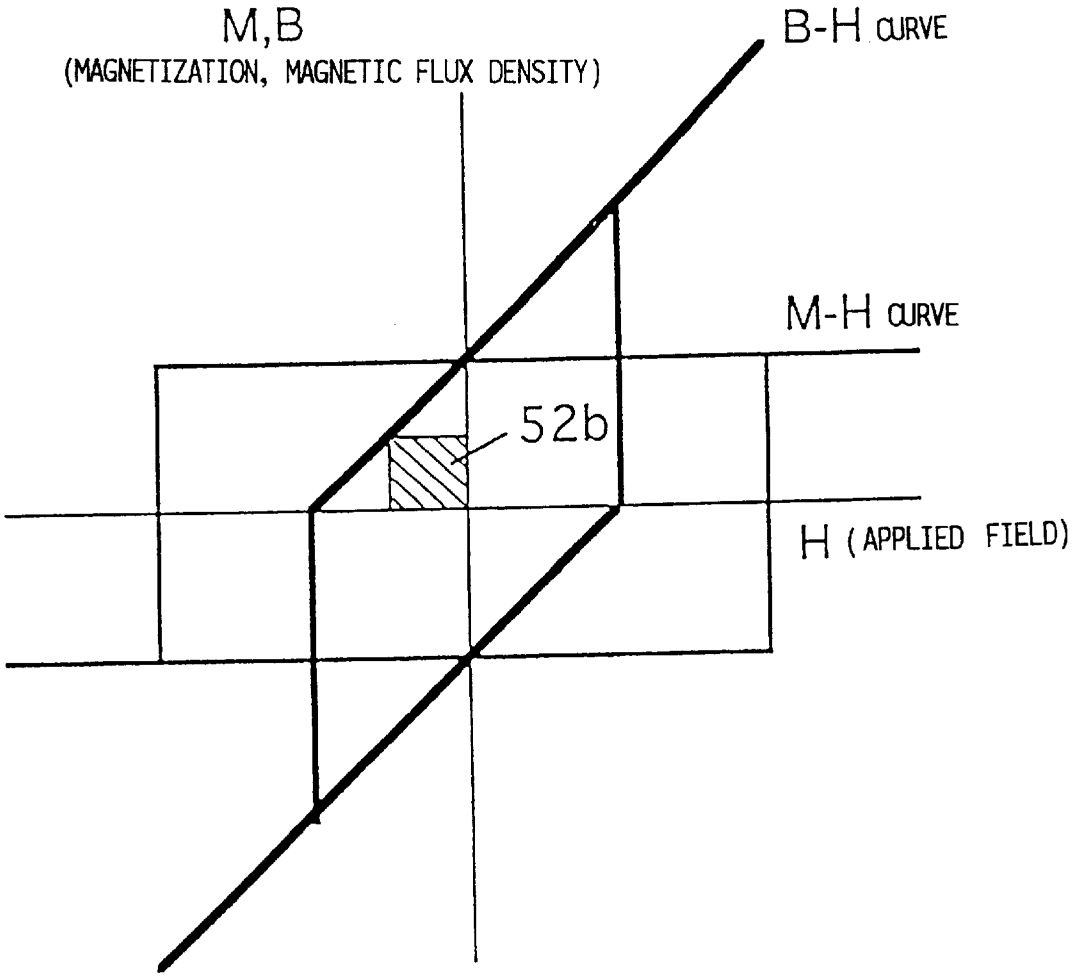
FIG. 11 shows (BH)max on BH curve of the magnet consist of V % magnet powder and (100-V) % resin.

The magnet powder and the thermosetting resin (A) were mixed into compounds to the ratio of 83 volume % and 17 volume %, respectively. Compression molding was carried out with a horizontal magnetic field molding apparatus as shown in FIG. 11*b* in the following manner.

The compound was filled in the mold which temperature was kept to 150° C. A magnetic field of 16 kOe as applied after filling the mold. Compression was started 15 seconds after starting the application of the magnetic field at a pressure of 8.0 ton/cm$^2$. After 24 seconds of compression, application of magnetic field and compression were stopped.

In the process, the thermosetting resin was melted by keeping the temperature of the mold to 150° C. When its viscosity is the lowest, the magnetization of the powder is aligned in a short duration of time and at the same time the composite of melted resin and the magnet powder is densified. Then magnetic field application and the compression were stopped when crosslinking of the resin had proceeded and the viscosity started to increase. At last the bonded magnet was taken out from the mold and cured at 150° C. fr 30 minutes.

These examples, and comparative example 1 and 2, were formed to a rectangular parallelepiped with the size of 10×10×7 mm.

Comparative example 1-1 compared to example 1 was manufactured in the same manner as that of example 1 except the molding temperature was kept at room temperature.

Comparative example 1-2 compared to example 1 was manufactured in the same manner as that of example 1 except the molding temperature was kept at 70° C. andcompression time of 30 seconds.

The maximum energy product (BH)max of example 1-a, b,c, comparative example 1-1-a,b,c, and 1-2-a,b,c are shown in table 1. The values in the parentheses are the rate in percent to the theoretical value for the given anisotropic magnet powder.

TABLE 1

| | type of magnet | | |
|---|---|---|---|
| | NdFeB type bonded magnet | SmFeN type bonded magnet | SmCo type bonded magnet |
| example | maximum energy product (BH)max (MGOe) | | |
| example 1 | 19.8 (80%) | 19.5 (81%) | 17.1 (80%) |
| comparative example 1-1 | 12.0 (48%) | 10.0 (42%) | 9.0 (42%) |
| comparative example 1-2 | 13.0 (53%) | 10.5 (44%) | 9.5 (44%) |

As shown in table 1, the maximum energy product of about 20 MGOe was obtained for the NdFeB type and SmFeN type, and about 17 MGOe for SmCo type bonded magnet. Example 1-a,b,c are superior to the comparative examples in all types of magnets. Furthermore, all values for examples are attained more than 80% of their theoretical value while comparative examples have only 42–63% of theoretical value. These results show that the present invention brings high magnet powder alignment to bonded magnets.

EXAMPLE 2 SERIES

The compound and the apparatus are the same as those of example 1 series.

The compound was filled in the mold which temperature was kept to 150° C. then preformed at a pressure of 3.0 ton/cm$^2$. A magnetic field of 16 kOe was applied after filling the mold. Compression was started 15 seconds after starting the application of the magnetic field at a pressure of 8.0 ton/cm$^2$. After 24 seconds of compression, application of magnetic field and compression were stopped.

Then the bonded magnet was taken out from the mold and cured at 150° C. for 30 minutes.

The preformed compound was given to compression molding in the same manner as the example 1 series were compression-molded except the molding temperature was kept at room temperature and the compression time was 30 seconds.

Then the bonded magnet was taken out from the mold and cured at 150° C. for 30 minute similar to example 1 series.

The maximum energy product (BH)max of example 2-a, b,c, comparative example 2-a,b,c are shown in table 2. The values in the parentheses are the rate in percent to the theoretical value for the given anisotropic magnet powder.

TABLE 2

| | type of magnet | | |
|---|---|---|---|
| | NdFeB type bonded magnet | SmFeN type bonded magnet | SmCo type bonded magnet |
| example | maximum energy product (BH)max (MGOe) | | |
| example 1 | 20.0 (81%) | 20.0 (84%) | 17.4 (82%) |
| comparative example 1-1 | 12.0 (49%) | 10.0 (42%) | 9.0 (42%) |

As shown in table 2, the values of example 2-a,b,c are improved by 0.0–0.5 MGOe from those of example 1-a,b,c, respectively, while the values of comparative example 2 series remain the same as those of the comparative example 1-1 series. It is presumed that bridging of the magnet powder is suppressed by preforming so that high density is attained, because the improvement is notable in SmFeN type bonded magnet which has finer particle powder susceptible for bridging. Also, in compression molding at room temperature the improvement by preforming is not seen.

Furthermore, all values for examples are attained 81–84% of their theoretical value while comparative examples have only 42–49% of theoretical value. These results show that the present invention brings high magnet powder alignment to bonded magnets.

EXAMPLE 3 SERIES

The compound and the apparatus are the same as those of example 1 series.

The magnets were manufactured in the same manner as example 1 series except they were cured in the mold at the temperature of 150° C. for 5 minutes without taking out from the mold. During the curing the pressure was kept to 8.0 ton/cm$^2$. Comparative example 3 series were manufactured in the same manner as example 1 series. They were taken out from the mold and curing was carried out at the temperature of 150° C. for 30 minutes.

The maximum energy product (BH)max of example 3 series, and comparative example 3 series are shown in table 3.

TABLE 3

| | type of magnet | | |
|---|---|---|---|
| | NdFeB type bonded magnet | SmFeN type bonded magnet | SmCo type bonded magnet |
| example | maximum energy product (BH)max (MGOe) | | |
| example 3 | 19.7 | 19.6 | 17.0 |
| comparative example 3 | 19.8 | 19.4 | 17.2 |
| remarks | none of the example 3 and comparative example 3 shows any crack or chipping-off | | |

As shown in table 3, the maximum energy product of the obtained magnets are equivalent in same type of magnet regardless of the difference in curing process. Also, all magnets show no crack nor chip-off. However curing in the mold saves successive curing step and reduce curing time from 30 minutes to 5 minutes.

EXAMPLE 4 SERIES

Figure 4:
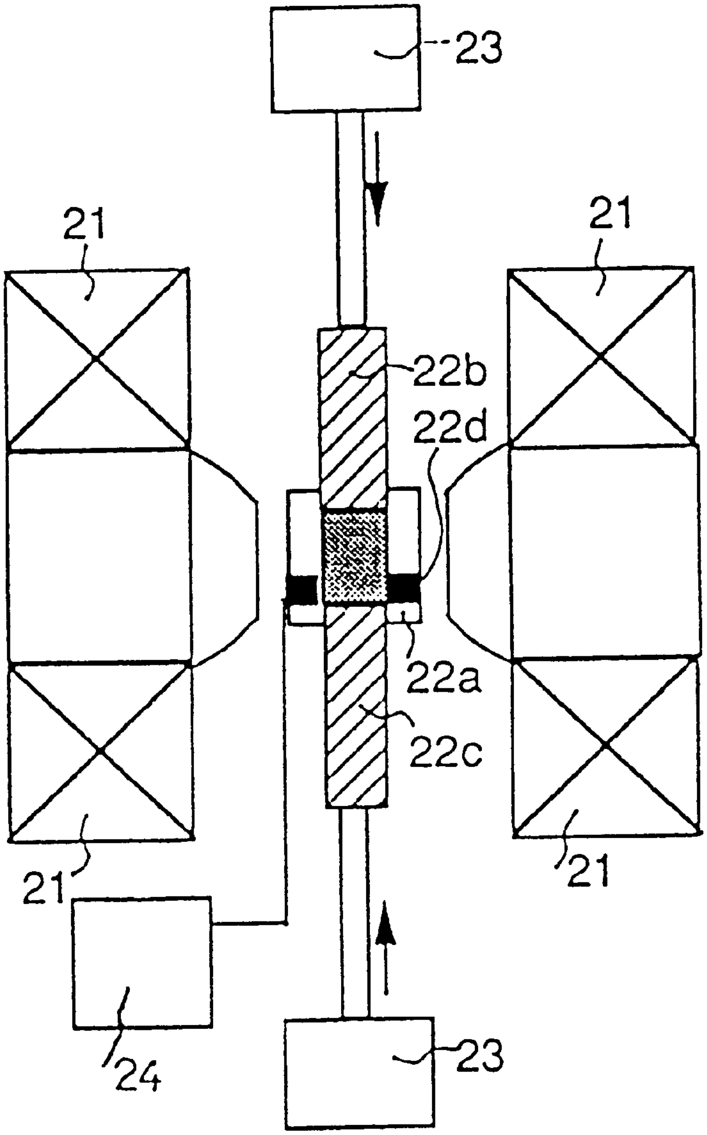
FIG. 4 shows schematic diagram of horizontal magnetic field compression molding apparatus with degassing and heating system.

In these examples the compound used is same as that of example 1 series. As the molding apparatus the one with degassing system shown in FIG. 4 was used.

The compound was filled in the mold which temperature was kept to 150° C. A magnetic field of 16 kOe was applied after filling the mold. Compression was started 15 seconds after starting the application of the magnetic field at a pressure of 8.0 ton/cm$^2$. At the same time degassing was started by reducing the pressure inside the mold. The pressure was reduced to 450 torr by rotary pump. The degassing, the magnetic field and compression were applied simultaneously at the temperature of 150° C. They were stopped when crosslinking of the resin had proceeded and the viscosity started to increase. Then the bonded magnet was taken out from the mold and cured at 150° C. for 30 minutes.

The maximum energy product (BH)max of example 4 series are shown in table 4.

TABLE 4

| | type of magnet | | |
|---|---|---|---|
| | NdFeB type bonded magnet | SmFeN type bonded magnet | SmCo type bonded magnet |
| example | maximum energy product (BH)max (MGOe) | | |
| example 4 | 20.2 (83%) | 20.5 (84%) | 17.6 (83%) |

As shown in table 4, maximum energy product of bonded magnets are improved by degassing to the extend of 0.4–1.0 MGOe. The obtained values are 83–84% of their theoretical value and superior to those of example 1 by as much as 3%.

These results shows that the degassing brings high density to bonded magnets.

EXAMPLE 5 SERIES

Figure 5:
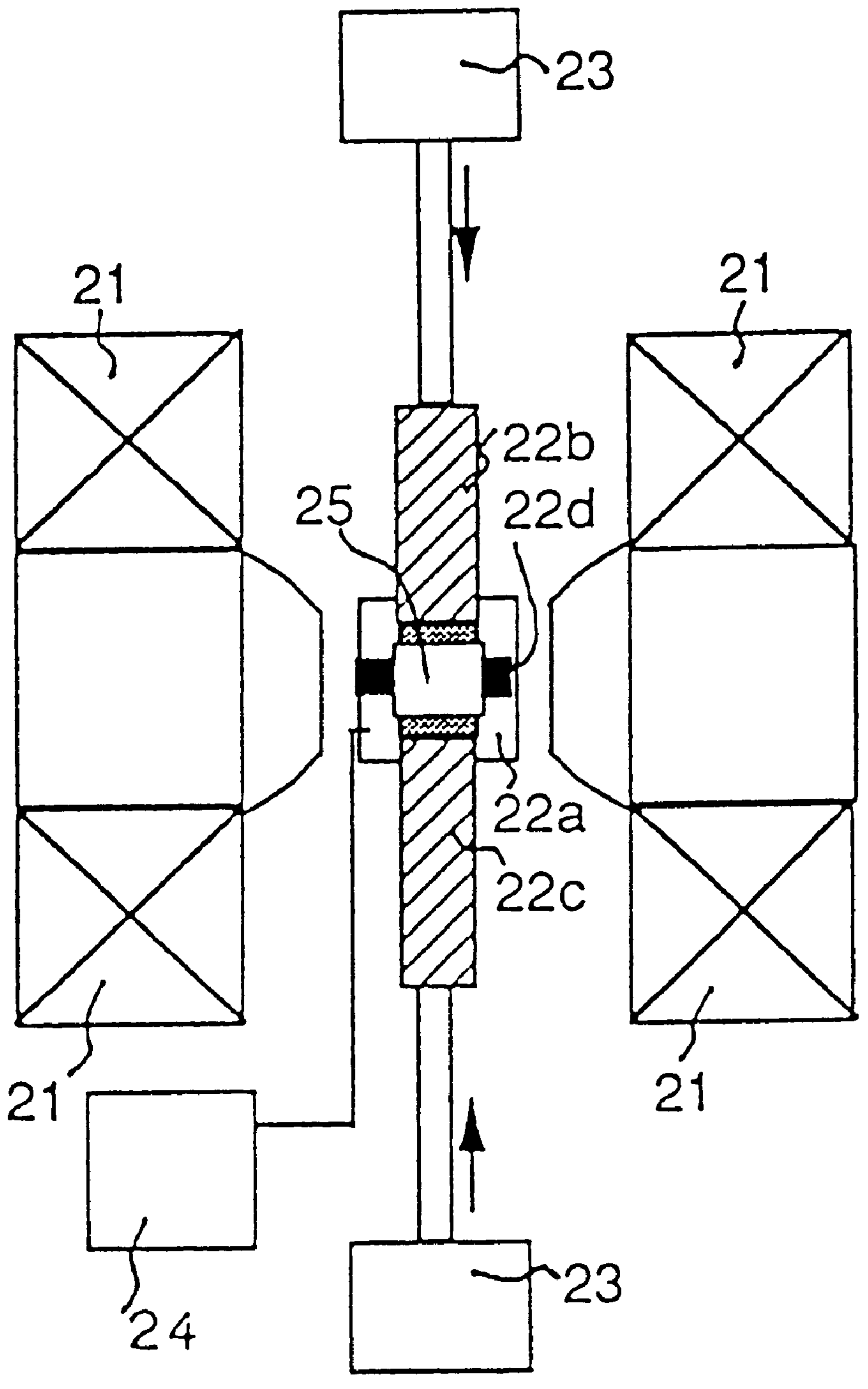
FIG. 5 shows schematic diagram of horizontal magnetic field compression molding apparatus with degassing ultrasonic vibrating and heating system.
Figure 6:
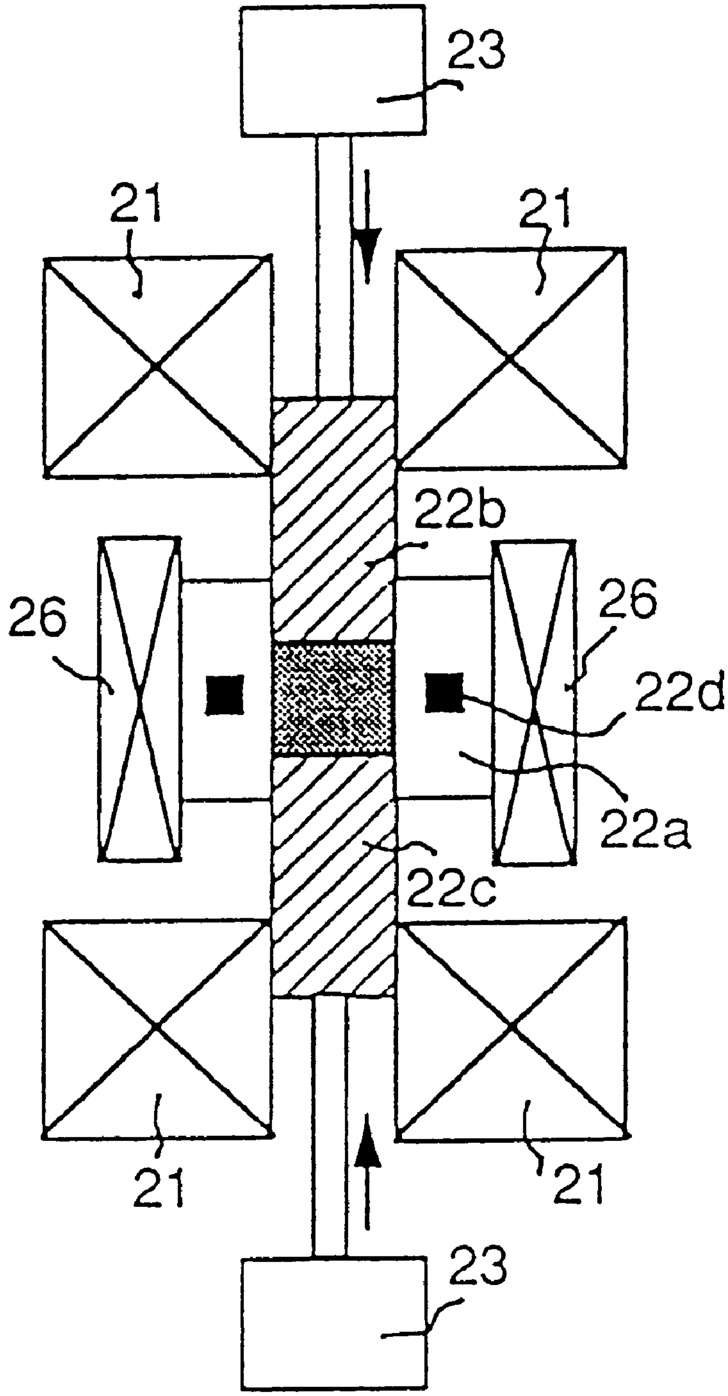
FIG. 6 shows schematic diagram compression molding apparatus with pulse and steady magnetic field apply system and heating system.
Figure 7:
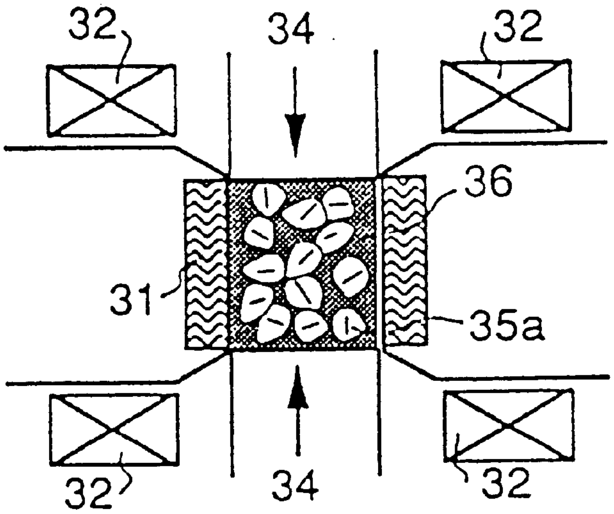
FIG. 7 shows direction of magnetization of the magnet powder in the heated mold before magnetic field application.
Figure 8:
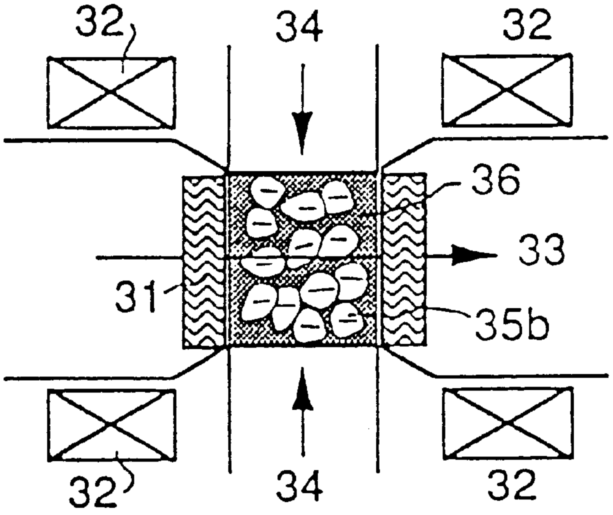
FIG. 8 shows direction of magnetization of the magnet powder in the heated mold after magnetic field application.
Figure 9:
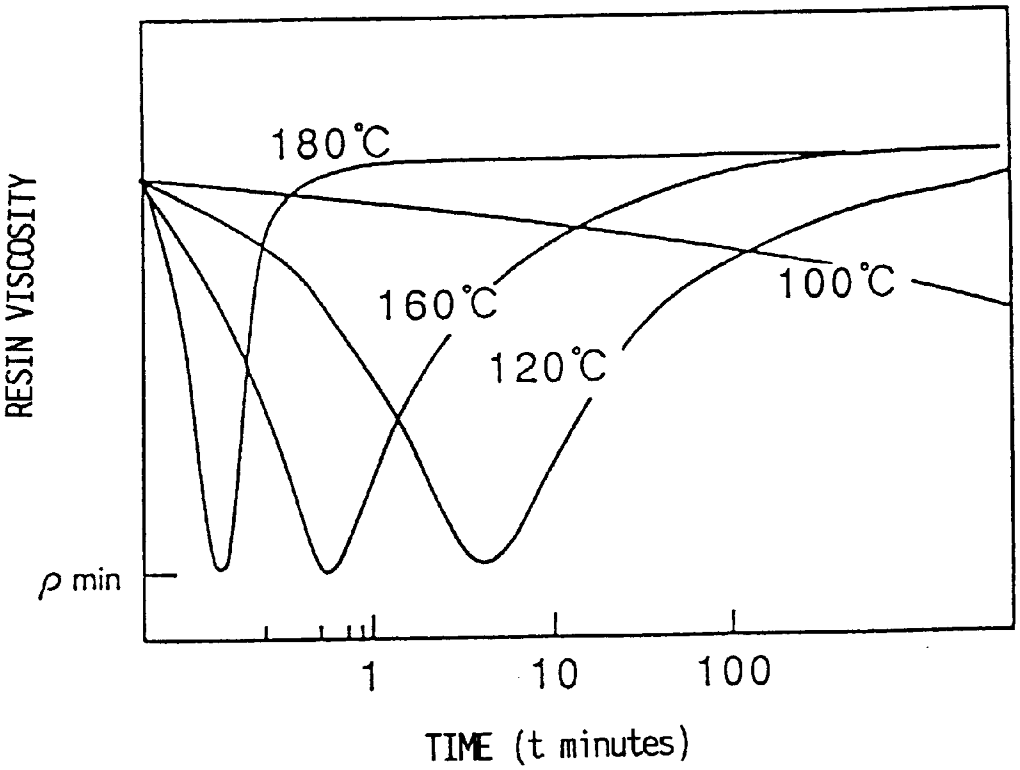
FIG. 9 shows time dependency of viscosity of the liquid epoxy resin at given temperatures.
Figure 10:
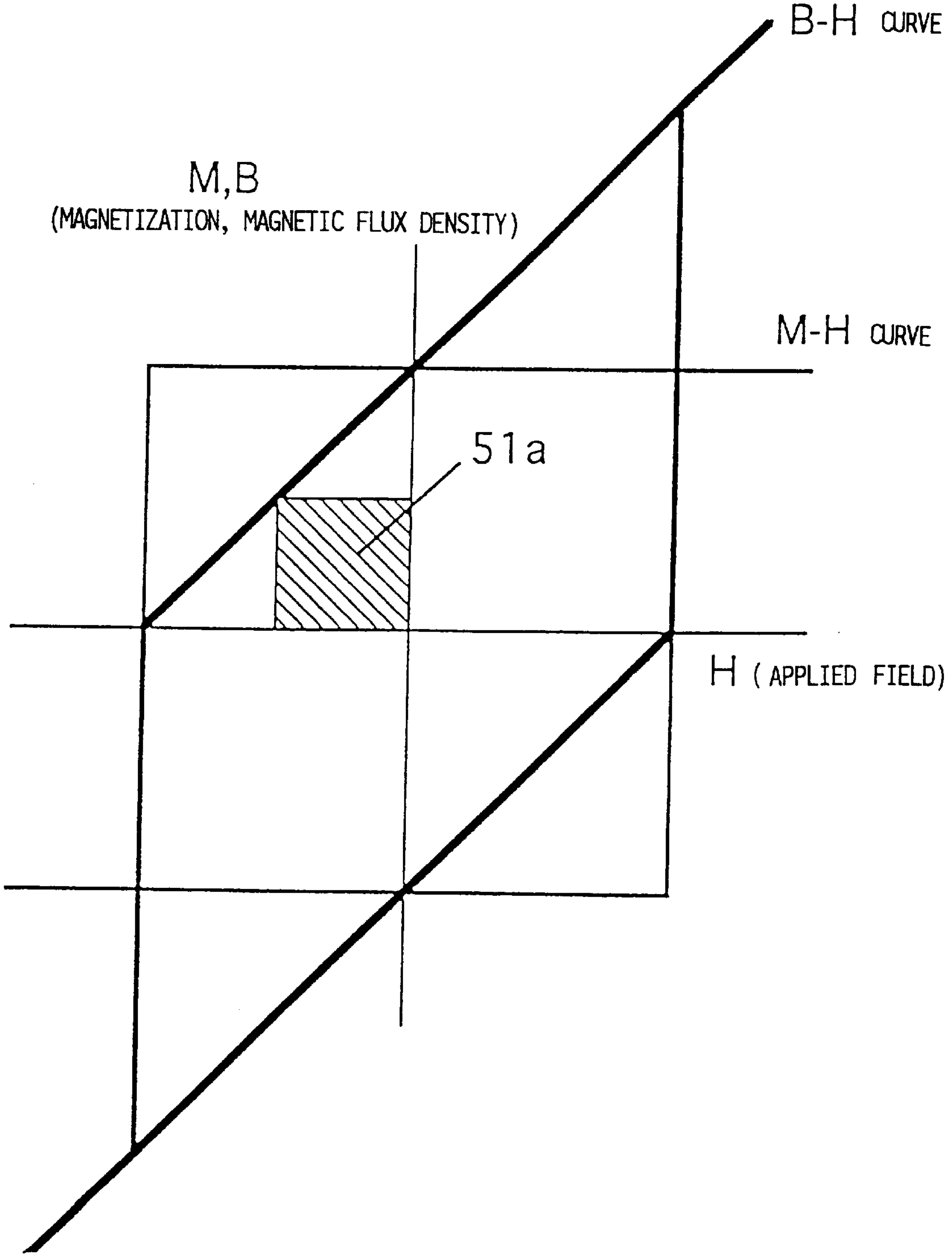
FIG. 10 shows (BH)max on BH curve of the magnet consist of 100% magnet powder (for example, sintered magnet).

In these examples the compound used is the same as that of example 1 series. As the molding apparatus the one with degassing and ultrasonic vibration system shown in FIG. 5 was used.

The compound was filled in the mold which temperature was kept to 150° C. A magnetic field of 16 kOe was applied after filling the mold. At the same time ultrasonic of 20 kHz was started to apply. Compression was started 15 seconds after starting the application of the magnetic field at a pressure of 6.5 ton/cm$^2$. The magnetic field and compression were applied simultaneously at the temperature of 150° C. They were stopped when crosslinking of the resin had proceeded and the viscosity started to increase. Then the bonded magnet was taken out from the mold and cured at 150° C. for 30 minutes.

The maximum energy product (BH)max of example 5 series are shown in table 5.

TABLE 5

| | type of magnet | | |
|---|---|---|---|
| | NdFeB type bonded magnet | SmFeN type bonded magnet | SmCo type bonded magnet |
| example | maximum energy product (BH)max (MGOe) | | |
| example 5 | 21.1 (85%) | 20.7 (86%) | 17.8 (84%) |

As shown in table 5, maximum energy product of bonded magnets are improved by ultrasonic vibration to the extent of 0.7–1.3 MGOe. The obtained values are 84–86% of their theoretical value and superior to those of example 1 by as much as 4–5% These results show that the ultrasonic vibration brings high density and high magnet powder alignment to bonded magnets.

The ultrasonic vibration brings another advantage that the molding pressure can be reduced from 8.0 to 6.5 ton/cm$^2$ to obtain the same level of maximum energy product as that of example 1 series and the lifetime of the mold is extended.

EXAMPLE 6 SERIES

Figure 2:
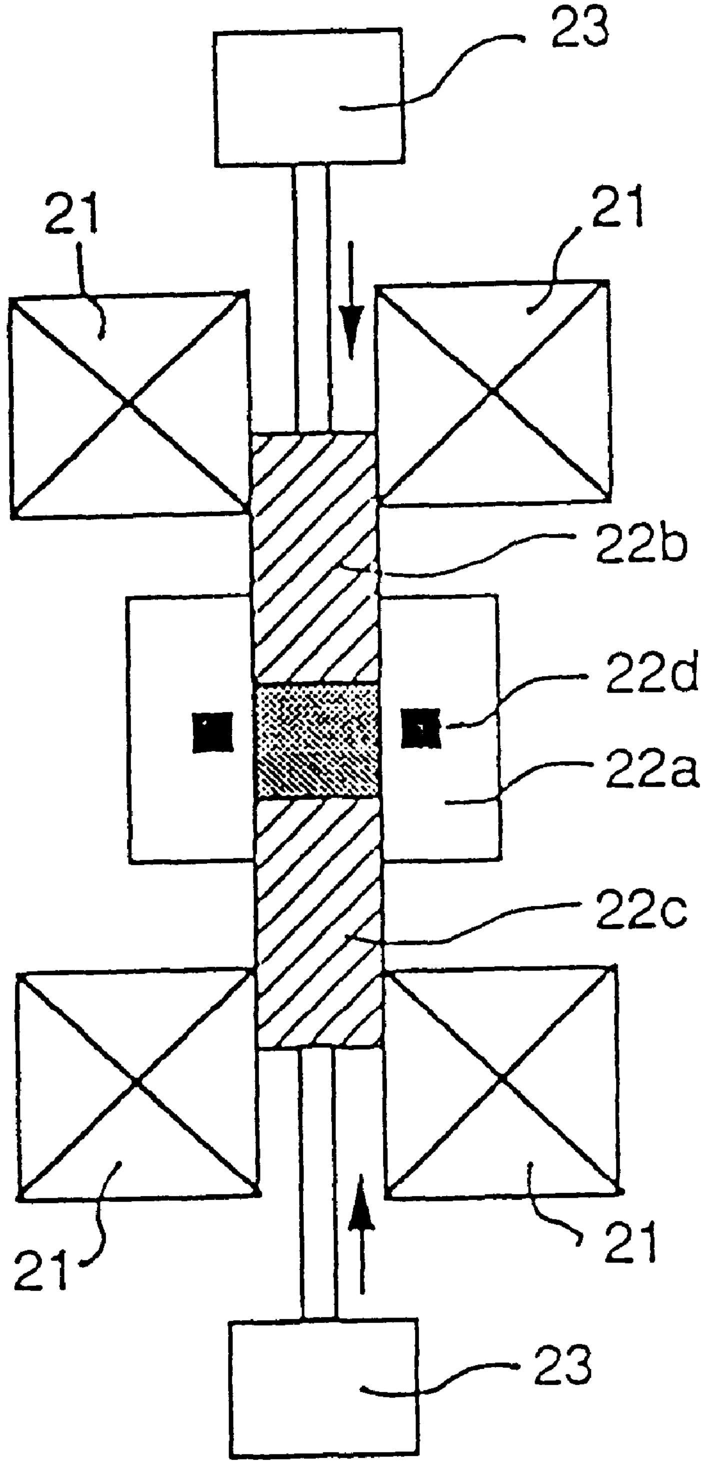
FIG. 2 shows schematic diagram of vertical magnetic field compression molding apparatus with heating system.
Figure 3:
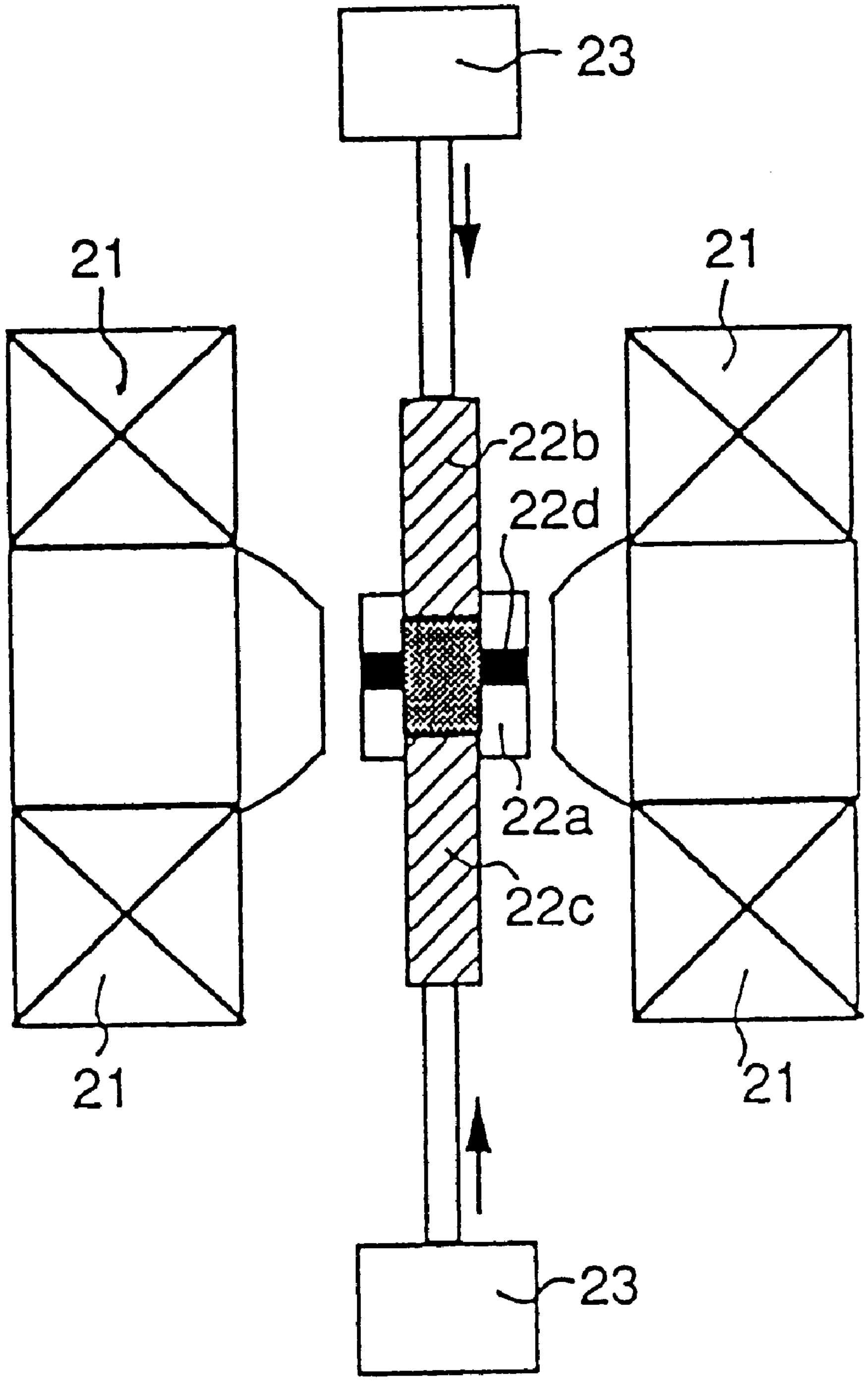
FIG. 3 shows schematic diagram of horizontal magnetic field compression molding apparatus with heating system.

In this series example 6-1-a,b,c were manufactured with pulse magnetic field and example 6-2-a,b,c with pulse field superimposed on steady magnetic field applied. Vertical molding apparatus used for the example 6-1-a,b,c is shown in FIG. 2.

The compound was filled in the mold which temperature was kept to 150° C. 1 second after the filling the mold repeated pulse magnetic field of 50 kOe was started to apply. One cycle of the pulse consists of applied time of 0.1 sec. and the interval of 2 sec. At the same time compression was started. The compression molding was carried out at the pressure was 8.0 ton/cm$^2$. The magnetic field and compression were applied simultaneously at the temperature of 150° C. They were stopped when crosslinking of the resin had proceeded and the viscosity started to increase. Then bonded magnet was taken out from the mold and cured at 150° C. for 30 minute.

Example 6-2-a,b,c were manufactured in the same manner as the example 6-1-a,b,c except the applied magnetic field was steady field of 16 kOe superimposed on pulse magnetic field of 50 kOe.

The comparative sample 4 series were manufactured without applying pulse magnetic field but steady field of 16 kOe.

The maximum energy product (BH)max of example 6-1-a,b,c, 6-2-a,b,c and comparative example 4-a,b,c are shown in table 6.

TABLE 6

| | type of magnet | | |
|---|---|---|---|
| | NdFeB type bonded magnet | SmFeN type bonded magnet | SmCo type bonded magnet |
| example | maximum energy product (BH)max (MGOe) | | |
| example 6-1 | 1.3 | 17.7 | 15.3 |
| example 6-2 | 17.9 | 18.0 | 15.8 |
| comparative example 4 | 17.0 | 17.2 | 15.0 |

As shown in table 6, the maximum energy product of the example 6-1a,b,c, which are manufactured with pulse field, are greater than that of example 4-a,b,c, which is with steady field, to the extent of 0.3–0.5 MGOe, respectively. The maximum energy product of examples 6-2-a,b,c which are manufactured with pulse field superimposed on steady field, are greater than that of examples 4-a,b,c, which is with steady field, to the extent of 0.8–0.9 MGOe, respectively.

EXAMPLE 7

Examples 7-a was manufactured with NdFeB type magnet powder (P1L) as the magnet powder and resin (A) as thermosetting resin. The magnet powder (P1L) and the thermosetting resin (A) were mixed into compounds to the ratio of 83 volume % and 7 volume %, respectively.

Examples 7-b was manufactured with NdFeB type magnet powder (P1L) as the magnet powder and resin (B) as thermosetting resin. The magnet powder (P1L) and the thermosetting resin (B) were mixed into compounds to the ratio of 83 volume % and 17 volume %, respectively.

The molding apparatus and manufacturing conditions were the same as for example 1 series except for the molding pressure increased to 8.5 ton/cm$^2$.

The maximum energy product (BH)max of example 7-a,b are shown in table 7.

TABLE 7

| | type of resin | |
|---|---|---|
| | thermosetting resin (A) (Epicoat 1004) | thermosetting resin (B) (Epicoat 801) |
| example | maximum energy product (BH)max (MGOe) | |
| example 7 | 20.7 | 23.0 |

As shown in table 7, example 7-a has maximum energy product of 20.7 MGOe which is higher than that of example 1-a. This is due to the high molding pressure. Example 7-b has the highest maximum energy product of 23.0 MGOe among those in example 1 to 6 series. This is due to the low molecular weight resin powder used in example 7-b.

The present invention offers anisotropic boned magnet with excellent magnetic property, more specifically more than 80% of theoretical value of maximum energy product for a given volume fraction V % of magnet. As a result, bonded magnets with the maximum energy of more than 20 MGOe are obtained.

What is claimed is:

1. A method for producing an anisotropic bonded magnet by compression molding comprising the steps of:

supplying a compound consisting essentially of anisotropic magnet powder and thermosetting resin powder to a mold heated to a temperature above a melting point of said resin powder, keeping said compound in said mold to heat said compound, applying a magnetic field at a moment when said resin powder is melted into a liquid state by heating so as to align said magnet powder under the condition of heating, and applying pressure to said compound for compacting until said resin is partially cured.

2. A method as set forth in claim 1, wherein said magnetic field is continuously applied until said resin is cured.

3. A method as set forth in claim 1, wherein said pressure is applied after applying said magnetic field.

4. A method as set forth in claim 1, wherein low pressure is applied until said resin is melted into the liquid state by heating, and high pressure is applied after melting.

5. A method as set forth in claim 1, wherein said anisotropic magnet powder is one of a Co magnet powder, a Fe—B magnet powder, and a Fe—N magnet powder.

6. A method as set forth in claim 5, wherein said Co magnet powder is Sm—Co magnet powder, said Fe—B magnet powder is Nd—Fe—B magnet powder, and said Fe—N magnet powder is Sm—Fe—N magnet powder.

7. A method as set forth in claim 1, wherein ultrasonic vibration is applied during said molding step.

8. A method as set forth in claim 1, wherein said pressure is not applied temporarily in order to evacuate gases contained in said mold during said molding step.

9. A method as set forth in claim 8, wherein said pressure in said mold is reduced at a moment when said pressure is not applied temporarily.

10. A method as set forth in claim 1, wherein said magnet powder is granulated powder, and said resin is coated on a surface of said magnet powder.

11. A method as set forth in claim 1, wherein the magnetic field is applied at the moment when a viscosity of said resin powder reaches a minimum.

12. A method as set forth in claim 11, wherein the pressure is applied simultaneously with the application of the magnetic field.

13. A method as set forth in claim 1, wherein the pressure is applied simultaneously with the application of the magnetic field.

14. A method as set forth in claim 1, wherein the magnetic field is continuously applied until said resin powder is cured.

15. A method for producing an anisotropic bonded magnet by compression molding comprising the steps of:

supplying a compound consisting essentially of anisotropic magnet powder and thermosetting resin powder in a mold, keeping said compound in said mold to heat said compound, applying a magnetic field to align said magnet powder under the condition of heating, applying low pressure until said resin powder is melted into a liquid state by said heating while maintaining the application of said magnetic field, and applying high pressure after said melting of said resin powder at least until said thermosetting resin cures.

16. A method for producing an anisotropic bonded magnet by compression molding comprising the steps of:

supplying a compound consisting essentially of anisotropic magnet powder and thermosetting resin powder in a mold, keeping said compound in said mold to heat said compound, applying a magnetic field to align said magnet powder under the condition of heating, and applying pressure for compacting said compound while maintaining the application of said magnetic and heating such that the thermosetting resin melts and is then cured, said pressure being not applied temporarily to evacuate gases contained in said mold during said applying pressure step.

17. A method as set forth in claim 16, wherein the pressure in said mold is reduced at a moment when said pressure is not applied temporarily.

* * * * *